United States Patent
Lindgren et al.

(10) Patent No.: US 7,948,436 B2
(45) Date of Patent: May 24, 2011

(54) ARRAY ANTENNA ARRANGEMENT

(75) Inventors: Ulf Lindgren, Västra Frölunda (SE);
Fredrik Athley, Kullavik (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 134 days.

(21) Appl. No.: 12/530,409

(22) PCT Filed: Mar. 9, 2007

(86) PCT No.: PCT/SE2007/050140
§ 371 (c)(1),
(2), (4) Date: Sep. 8, 2009

(87) PCT Pub. No.: WO2008/111882
PCT Pub. Date: Sep. 18, 2008

(65) Prior Publication Data
US 2010/0013710 A1    Jan. 21, 2010

(51) Int. Cl.
*H01Q 3/00* (2006.01)
*H01Q 3/02* (2006.01)
(52) U.S. Cl. .......... 342/373; 342/374
(58) Field of Classification Search ........... 342/373, 342/374
See application file for complete search history.

(56) References Cited

U.S. PATENT DOCUMENTS

| | | | | |
|---|---|---|---|---|
| 6,104,345 A | * | 8/2000 | Tweg et al. | 342/417 |
| 6,795,424 B1 | * | 9/2004 | Kapoor et al. | 370/343 |
| 7,009,912 B1 | * | 3/2006 | Haley | 367/124 |
| 7,822,442 B2 | * | 10/2010 | Jin et al. | 455/562.1 |
| 2002/0190902 A1 | * | 12/2002 | Samson et al. | 342/418 |
| 2004/0198452 A1 | * | 10/2004 | Roy | 455/562.1 |
| 2005/0101253 A1 | * | 5/2005 | Pajukoski et al. | 455/63.1 |
| 2005/0195103 A1 | * | 9/2005 | Davis et al. | 342/99 |
| 2006/0158375 A1 | * | 7/2006 | Macleod | 342/417 |
| 2007/0285315 A1 | * | 12/2007 | Davis et al. | 342/377 |

* cited by examiner

*Primary Examiner* — Thomas H Tarcza
*Assistant Examiner* — Frank McGue
(74) *Attorney, Agent, or Firm* — Roger S. Burleigh

(57) ABSTRACT

The present invention relates to an array antenna arrangement comprising at least two antenna sub-arrays and at least one antenna element in each antenna sub-array. The array antenna arrangement is adapted for calculation of a total covariance matrix (R) of a received signal vector (x). The array antenna arrangement further comprises at least one switch, where the number of switches corresponds to the number of antenna elements in each antenna sub-array. Each switch is connected to a respective radio chain, and is arranged to connect the antenna elements of a respective corresponding antenna sub-array to the respective radio chain cyclically. At least one full switch cycle, comprising a set of received signals for each switch configuration, is carried out for a calculation of the total covariance matrix (R). The present invention also relates to a corresponding method.

15 Claims, 1 Drawing Sheet

ARRAY ANTENNA ARRANGEMENT

TECHNICAL FIELD

The present invention relates to an array antenna arrangement comprising at least two antenna sub-arrays and at least one antenna element in each antenna sub-array, the array antenna arrangement being adapted for calculation of a total covariance matrix of a received signal vector.

The present invention also relates to a method for calculation of a total covariance matrix of a signal vector, received by means of at least two antenna sub-arrays and at least one antenna element in each sub-array

BACKGROUND

In communication systems, it is often desirable to obtain the covariance of a received signal vector, for example in order to estimate DOA (Direction of arrival). An antenna lobe may then be directed towards a specific user. Today, an array antenna comprising a number of antenna elements, spaced apart approximately $\lambda/2$ in order to avoid grating lobes, and an amplifier coupled to each antenna element, are used. Here, $\lambda$ denotes the wavelength corresponding to the frequency used, for example the centre frequency of the frequency band used. The received signals form an M×1 vector, where M is the number of elements. DOA is calculated by means of the covariance of the received signal vector.

For a so-called sparse array antenna, the distance between adjacent antenna elements exceeds $\lambda/2$. Said distance may be several $\lambda$.

It may be desirable to use a sparse array antenna to obtain the covariance of a received signal vector, for example in order to estimate DOA, since mutual coupling between antenna elements is lowered and a high resolution is obtained using few antenna elements. Furthermore, the number of receivers/transmitters is lowered. But there is a problem when using a sparse array antenna, since the covariance matrix becomes ambiguous due to spatial undersampling.

There is thus a need for an array antenna arrangement that is adapted for obtaining the covariance of a received signal vector, for example in order to estimate DOA, without said ambiguity, having a lowered number of receivers/transmitters.

Furthermore, the covariance of the received signal vector may be used for several other purposes than estimating DOA, for example estimating the channel and suppression of interference. For these cases, the calculation results in an ambiguity in the same way as described above. There is thus a general problem that is to be solved; to calculate an unambiguous covariance matrix of a received signal vector, with a lowered number of receivers/transmitters.

SUMMARY

The object of the present invention is to provide an array antenna arrangement that is adapted for calculating an unambiguous covariance matrix for a received signal vector, with a lowered number of receivers/transmitters.

The object of the present invention is also to provide a method for calculating an unambiguous covariance matrix for a received signal vector, having the advantages of a sparse array antenna.

Said object is achieved by means of an array antenna arrangement as mentioned initially, wherein the array antenna arrangement further comprises at least one switch, where the number of switches corresponds to the number of antenna elements in each antenna sub-array, each switch being connected to a respective radio chain, each switch further being arranged to connect the antenna elements of a corresponding antenna sub-array to the respective radio chain cyclically, where at least one full switch cycle, comprising a set of received signals for each switch configuration, is carried out for a calculation of the total covariance matrix.

Said object is achieved by means of a method as mentioned initially, wherein the method comprises the steps: cyclically acquiring a plurality of sets of received signals such that one full cycle results in acquired sets of received signals which together form the signal vector; and using at least one full cycle for each calculation of a total covariance matrix.

According to an embodiment example, correlations are calculated for each set of received signals during a full switch cycle, forming covariance sub-matrices, and that those covariance sub-matrices are combined so as to form the total covariance matrix.

According to another embodiment example, the sets of received signals for a full switch cycle are combined, forming the received signal vector, where the total covariance matrix is calculated directly for the received signal vector.

According to embodiment examples, the calculated covariance matrix is used for estimating DOA, estimating the channel or suppression of interference.

In a preferred embodiment, the coupling between adjacent antenna elements is lowered, the array antenna arrangement having the advantages of a sparse array antenna.

Further preferred embodiments are apparent from the dependent claims.

A number of advantages are obtained from the present invention. For example:

The number of radio chains is reduced.
An unambiguous covariance matrix may be calculated for a received signal vector.

BRIEF DESCRIPTION OF THE DRAWINGS

The present invention will now be described more in detail with reference to the appended drawings, where FIG. 1 schematically shows an array antenna arrangement according to the present invention.

DETAILED DESCRIPTION

Figure 1:
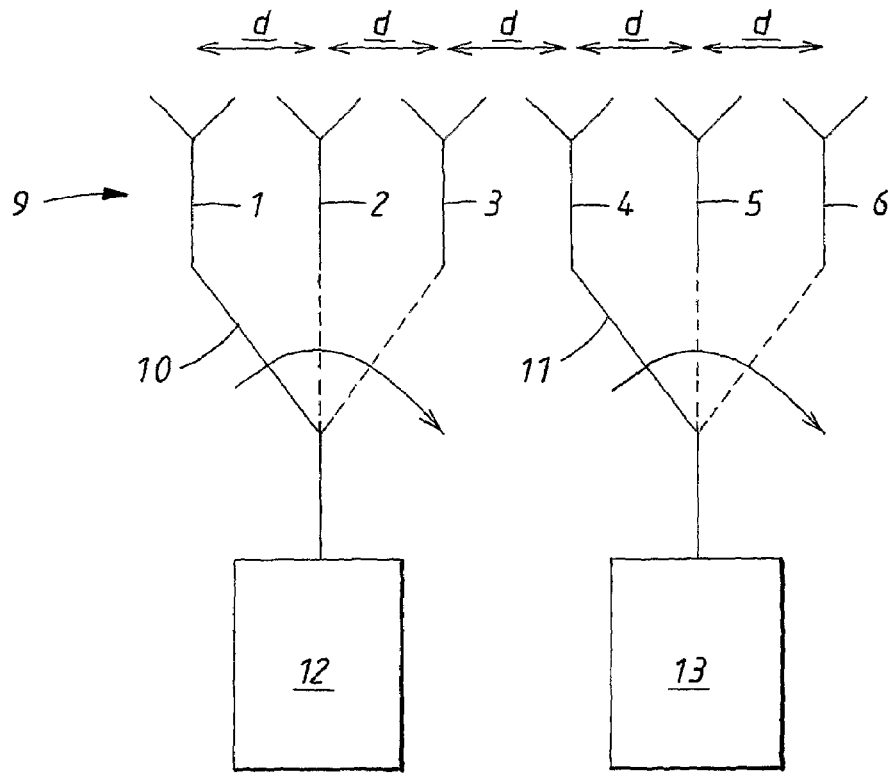

A preferred embodiment according to the present invention comprising a first antenna element 1, a second antenna element 2, a third antenna element 3, a fourth antenna element 4, a fifth antenna element 5 and a sixth antenna element 6 is shown in FIG. 1.

The element distance d between all elements 1, 2, 3, 4, 5, 6, is approximately $\lambda/2$, where $\lambda$ denotes the wavelength corresponding to the frequency used, for example the centre frequency of the frequency band used.

A first switch 10 switches between the elements 1, 2, 3, and a second switch 11 switches between the elements 4, 5, 6. The first switch 10 is connected to a first radio chain 12 and the second switch 11 is connected to a second radio chain 13. Each radio chain 12, 13 is of a traditional kind.

Those antenna elements that are arranged to be connected to a respective radio chain at a certain moment, i.e. for a certain switch configuration, constitute a sub-array. In the preferred embodiment above, the first antenna element 1 and the fourth antenna element 4 constitute a first sub-array, the second antenna element 2 and the fifth antenna element 5 constitute a second sub-array, and the third antenna element 3 and the sixth antenna element 6 constitute a sixth sub-array.

In the preferred embodiment above, the number of sub-arrays is K=3 and the number of antenna elements 1, 2, 3, 4, 5, 6 in each sub-array is P=2. The total number of antenna elements M=6, where generally M=P*K, all integers. Furthermore, generally, K≦(M/2), K≧2 and P≧1. This leads to that M≧2.

The switches 10, 11 cyclically switch between the antenna elements 1, 4; 2, 5; 3, 6 in the respective sub-array and the respective radio chain 12, 13.

For a certain moment in time, the switches 12, 13 having a certain configuration, each one connecting one antenna element 1, 2, 3; 4, 5, 6 to a respective radio chain 12, 13, only K=2 signals may be observed. Therefore, a calculated covariance matrix of the received signals can at the most have rank K=2. The received signal is then written as a received signal vector $$x = \begin{bmatrix} x_a \\ x_b \end{bmatrix}$$

where $x_a$ and $x_b$ are the observed signals at a certain time, where a and b refer to certain antenna elements 1, 2, 3; 4, 5, 6 in the array antenna 9, those antenna elements 1, 2, 3; 4, 5, 6 being those that at the time deliver the observed signals.

The covariance matrix is calculated as $$R_{2\times 2} = E[xx^H],$$

where $R_{2\times 2}$ in this case is a 2×2 matrix. But such a sub-covariance $R_{2\times 2}$ is incomplete, since not all the antenna elements' 1, 2, 3; 4, 5, 6 signals $x_1, x_2, x_3; x_4, x_5, x_6$ are observed. This sub-covariance may also be ambiguous if the observed signals are received from antenna elements spaced apart more than λ/2.

Therefore, a mapping from a covariance matrix of the size P×P to a covariance matrix of the size M×M is performed. For this purpose, a matrix E is used, where E is an M×P-matrix which contains certain columns from an identity matrix $I_M$ having the size M×M. The columns used are these that have a "one" in the same position as the antenna elements delivering the observed signals at a certain time. We then write $$\tilde{x}_k = E_k x_k,$$

where k runs from 1 to K.

The present invention is illustrated with three detailed examples, first a relatively simple first example with reference to FIG. 1, and then with more general second and third examples. The first example describes a calculation method for achieving the present invention. Between the first example and the two following examples, there is a special section describing an alternative calculation method, used in the second example.

The First Example

If the switches 10, 11 are in the position indicated with a solid line in FIG. 1, the first antenna elements 1 and the fourth antenna element 4, the first sub-array, are engaged, and the signals $x_1$ and $x_4$ are observed, being a first set of observed signals. This is the case for k=1. We then write $$\tilde{x}_1 = E_1 x_1 = \begin{bmatrix} 1 & 0 \\ 0 & 0 \\ 0 & 0 \\ 0 & 1 \\ 0 & 0 \\ 0 & 0 \end{bmatrix} \begin{bmatrix} x_1 \\ x_4 \end{bmatrix} = \begin{bmatrix} x_1 \\ 0 \\ 0 \\ x_4 \\ 0 \\ 0 \end{bmatrix}$$

The same procedure is run for k=2, where the switches 10, 11 engage the 5 second antenna element 2 and the fifth antenna element 5, the second sub-array, and the signals $x_2$ and $x_5$ are observed, being a second set of observed signals. The same procedure is also run for k=3, where the switches 10, 11 engage the third antenna element 3 and the sixth antenna element 6, the third sub-array, and the signals $x_3$ and $x_6$ are observed, being a third set of observed signals. This results in corresponding $\tilde{x}_2$ and $\tilde{x}_3$, and a sum is created according to the below:

$$\tilde{x}_1 + \tilde{x}_2 + \tilde{x}_3 = \begin{bmatrix} x_1 \\ 0 \\ 0 \\ x_4 \\ 0 \\ 0 \end{bmatrix} + \begin{bmatrix} 0 \\ x_2 \\ 0 \\ 0 \\ x_5 \\ 0 \end{bmatrix} + \begin{bmatrix} 0 \\ 0 \\ x_3 \\ 0 \\ 0 \\ x_6 \end{bmatrix} = \begin{bmatrix} x_1 \\ x_2 \\ x_3 \\ x_4 \\ x_5 \\ x_6 \end{bmatrix}.$$

Then a total covariance is calculated as $$R = E\{(\tilde{x}_1 + \tilde{x}_2 + \tilde{x}_3)(\tilde{x}_1 + \tilde{x}_2 + \tilde{x}_3)^H\}$$

or, more general:

$$R = E\left\{\left(\sum_{k=1}^{K} \tilde{x}_k\right)\left(\sum_{k=1}^{K} \tilde{x}_k\right)^H\right\} \quad (1)$$

According to equation (1), the expected value operator works on the total matrix to form the 6×6 total covariance matrix R directly.

The switching may be general, i.e. the M elements may be sampled in any order, where the variety using cyclic switching only is one combination out of the total number of combinations. A sub-array is still constituted by those antenna elements that are arranged to be connected to a respective radio chain at a certain moment, i.e. for a certain switch configuration.

Background for the Second Example, Describing an Alternative Calculation Method

A slightly different way to calculate the total covariance matrix R than according to equation (1) is to form sub-matrices, where a covariance sub-matrix is formed for each sub-matrix. These covariance sub-matrices are then placed into the correct places to form the total covariance matrix R. Each sub-matrix contains the observed signals for a certain switch configuration, i.e. at a certain time, these observed signals constitute an observed set of signals.

In the following example, the sub-matrices are of the size 2×2 and the total covariance matrix R is of the size 6×6.

The placing is performed by means of the following expression:

$$R = \sum_{k=1}^{K} \sum_{l=1}^{K} I_M(S_k) \tilde{R}(k-1; S_k \circ S_l) I_M^T(S_l) \quad (2)$$

Here, S is a set comprising a number of subsets, where all subsets comprise unique components and no component is "left out". This is expressed as $$S = \bigcup_{k=1}^{K} S_k \quad (3)$$

and $$\cap_{k=1}^{K} S_k = 0.$$

$I_M(S_k)$ denotes a matrix consisting of the columns corresponding to the elements in $S_k$, while $\tilde{R}$ is the covariance matrix.

$$\tilde{R}_{kl} = E\{x(S_k)x(S_l)^H\}, \quad (4)$$

where x are observations from the antenna elements indexed by $S_k$ and $S_l$. The notation "$S_k \circ S_l$" in equation (2) above is a non-standard notation which here is used to define spatial lags associated with $\tilde{R}$.

In the following, two more detailed examples, a second example and a third example, of calculations varieties for the configuration according to FIG. 1 will be disclosed—one example for each way described above. An important difference from FIG. 1 is, however, that each switch 10, 11 is configured to reach any antenna element 1, 2, 3, 4, 5, 6, providing a more general arrangement, where any combination of antenna elements is possible and is repeated cyclically. This means that the sub-arrays have a different composition than previously described.

In the examples, the antenna elements 1, 2, 3, 4, 5, 6 are switched in such a way that the first two antenna elements that are engaged are the first antenna element 1 and the fourth antenna element 4, constituting a first sub-array, the second two antenna elements are the fifth antenna element 5 and the sixth antenna element 6, constituting a second sub-array, and the third two antenna elements are the second antenna element 2 and the third antenna element 3, constituting a third sub-array. In this way, three sub-arrays are formed, the sub-arrays forming the following sets $S_1$, $S_2$ and $S_3$: {1,4}, {5,6} and {2,3}. As stated above, the number of sub-arrays is P=2 and the number of antenna elements in each sub-array is K=3.

In the following examples, for the sake of clarity, time lags are also taken into account. In order to implement the present invention practically, the signal should vary relatively slowly compared with the switching time, such that time lags do not have to be taken into account for the calculations. Otherwise, the covariance matrix will be erroneous.

The Second Example

In the second example, we use the equations (2)-(4). According to equation (4), $K^2=9$ covariance matrices of the size P×P, i.e. 2×2, are acquired. The indeces l and k run from 1 to K, here K=3.

For l=k=1:

$$\tilde{R}_{1,1} = E\left\{\begin{bmatrix} x_1(n) \\ x_4(n) \end{bmatrix}\begin{bmatrix} x_1^*(n) & x_4^*(n) \end{bmatrix}\right\} = \begin{bmatrix} R(0,0) & R(0,3) \\ R(0,-3) & R(0,0) \end{bmatrix}$$

Advancing l results in the following:

$$\tilde{R}_{1,2} = \begin{bmatrix} R(1,4) & R(1,5) \\ R(1,1) & R(1,2) \end{bmatrix}$$

$$\tilde{R}_{1,3} = \begin{bmatrix} R(2,1) & R(2,2) \\ R(2,-2) & R(2,-1) \end{bmatrix}$$

where the arguments in the correlation function $R(\alpha,\beta)$ are time and spatial lag, respectively.

Furthermore, the index k is advanced to 2, and l=1 again:

$$\tilde{R}_{2,1} = E\left\{\begin{bmatrix} x_5(n+1) \\ x_6(n+1) \end{bmatrix}\begin{bmatrix} x_1^*(n) & x_4^*(n) \end{bmatrix}\right\} = \begin{bmatrix} R(-1,-4) & R(-1,-1) \\ R(-1,-5) & R(-1,-2) \end{bmatrix}$$

Advancing l results in the following:

$$\tilde{R}_{2,2} = \begin{bmatrix} R(0,0) & R(0,1) \\ R(0,-1) & R(0,0) \end{bmatrix}$$

$$\tilde{R}_{2,3} = \begin{bmatrix} R(1,3) & R(1,-2) \\ R(1,-4) & R(1,-3) \end{bmatrix}$$

Finally, the index k is advanced to 3, and l=1 again:

$$\tilde{R}_{3,1} = E\left\{\begin{bmatrix} x_2(n+2) \\ x_3(n+2) \end{bmatrix}\begin{bmatrix} x_1^*(n) & x_4^*(n) \end{bmatrix}\right\} = \begin{bmatrix} R(-2,-1) & R(-2,2) \\ R(-2,-2) & R(-2,1) \end{bmatrix}$$

Advancing l results in the following:

$$\tilde{R}_{3,2} = \begin{bmatrix} R(-1,3) & R(-1,4) \\ R(-1,2) & R(-1,3) \end{bmatrix}$$

$$\tilde{R}_{3,3} = \begin{bmatrix} R(0,0) & R(0,1) \\ R(0,-1) & R(0,0) \end{bmatrix}$$

Above, nine 2×2 matrices have been formed, and now the task is to combine these matrices to one 6×6 matrix. In order to find the correct element placing in this matrix, equation (2) is used. In equation (2) the term $I_M(S_k)$ and $I_M^T(S_k)$ are present, and for k=l=1, the following is stated:

$$I_M(S_1) = \begin{bmatrix} 1 & 0 \\ 0 & 0 \\ 0 & 0 \\ 0 & 1 \\ 0 & 0 \\ 0 & 0 \end{bmatrix}$$

$$I_M^T(S_1) = \begin{bmatrix} 1 & 0 & 0 & 0 & 0 & 0 \\ 0 & 0 & 0 & 1 & 0 & 0 \end{bmatrix}$$

Now, inserting all known parameters into equation (2), it follows that:

$$R_{1,1} = I_M(S_1)\tilde{R}_{1,1}I_M^T(S_1)$$

$$= \begin{bmatrix} 1 & 0 \\ 0 & 0 \\ 0 & 0 \\ 0 & 1 \\ 0 & 0 \\ 0 & 0 \end{bmatrix} \begin{bmatrix} R(0,0) & R(0,3) \\ R(0,-3) & R(0,0) \end{bmatrix} \begin{bmatrix} 1 & 0 & 0 & 0 & 0 & 0 \\ 0 & 0 & 0 & 1 & 0 & 0 \end{bmatrix} =$$

$$= \begin{bmatrix} R(0,0) & R(0,3) \\ 0 & 0 \\ 0 & 0 \\ R(0,0) & R(0,-3) \\ 0 & 0 \\ 0 & 0 \end{bmatrix} \begin{bmatrix} 1 & 0 & 0 & 0 & 0 & 0 \\ 0 & 0 & 0 & 1 & 0 & 0 \end{bmatrix}$$

$$= \begin{bmatrix} R(0,0) & 0 & 0 & R(0,3) & 0 & 0 \\ 0 & 0 & 0 & 0 & 0 & 0 \\ 0 & 0 & 0 & 0 & 0 & 0 \\ R(0,-3) & 0 & 0 & R(0,0) & 0 & 0 \\ 0 & 0 & 0 & 0 & 0 & 0 \\ 0 & 0 & 0 & 0 & 0 & 0 \end{bmatrix}$$

Solving in the same manner for the eight remaining terms in equation (2) yields the final result:

$$R = \begin{bmatrix} R(0,0) & R(2,1) & R(2,2) & R(0,3) & R(1,4) & R(1,5) \\ R(-2,-1) & R(0,0) & R(0,1) & R(-2,2) & R(-1,3) & R(-1,4) \\ R(-2,-2) & R(0,-1) & R(0,0) & R(-2,1) & R(-1,2) & R(-1,3) \\ R(0,3) & R(2,-2) & R(0,-1) & R(0,0) & R(0,1) & R(1,2) \\ R(-1,-4) & R(2,-3) & R(0,-2) & R(0,-1) & R(0,0) & R(0,1) \\ R(-1,-5) & R(1,-4) & R(1,-3) & R(-1,-2) & R(0,-1) & R(0,0) \end{bmatrix}$$

The Third Example

The third example uses equation (1) for the same terms as in the second example:

$$R = E\left\{ \begin{bmatrix} x_1(n) \\ x_2(n+2) \\ x_3(n+2) \\ x_4(n) \\ x_5(n+1) \\ x_6(n+1) \end{bmatrix} [x_1^*(n) \ x_2^*(n+2) \ x_3^*(n+2) \ x_4^*(n) \ x_5^*(n+1) \ x_6^*(n+1)] \right\} =$$

$$= \begin{bmatrix} R(0,0) & R(2,1) & R(2,2) & R(0,3) & R(1,4) & R(1,5) \\ R(-2,-1) & R(0,0) & R(0,1) & R(-2,2) & R(-1,3) & R(-1,4) \\ R(-2,-2) & R(0,-1) & R(0,0) & R(-2,1) & R(-1,2) & R(-1,3) \\ R(0,3) & R(2,-2) & R(0,-1) & R(0,0) & R(0,1) & R(1,2) \\ R(-1,-4) & R(2,-3) & R(0,-2) & R(0,-1) & R(0,0) & R(0,1) \\ R(-1,-5) & R(1,-4) & R(1,-3) & R(-1,-2) & R(0,-1) & R(0,0) \end{bmatrix}$$

As evident from the above, the same result is achieved as for the second example. The third example shows that the same result is obtained irrespective of which one of the first calculation method and the second calculation method that is used.

The practical difference between the calculation methods is different use of calculation capacity. The first calculation method, used in the first and third example, performs one relatively large calculation, calculating the covariance directly for the 6×6 matrix. The second method, used in the second example, performs a number of smaller calculations, calculating the covariance for 9 2×2 matrices and then combining these 9 matrices into the final 6×6 matrix.

This practical difference between these methods results in that a processor, arranged for performing the covariance calculations, has to wait for the relatively large calculation in the first calculation method, while it performs smaller calculations in a more continuous manner in the second calculation method. Using the first calculation method may thus result in an uneven load balance for the processor compared with the second calculation method.

The size of the matrices is determined by the integers P and K where $K \leq (M/2)$, and may of course vary. As mentioned initially, generally, M=P*K. M, P and K are all integers.

Figure 2:
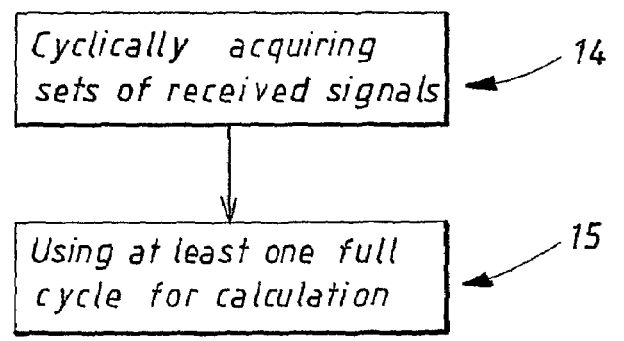
FIG. 2 shows a block diagram for a method according to the present invention.

With reference to FIG. 2, the present invention relates to a method for calculation of a total covariance matrix R of a signal vector x, received by means of at least two antenna sub-arrays and at least one antenna element in each sub-array. The method comprises the steps:

14: cyclically acquiring a plurality of sets of received signals such that one full cycle results in acquired sets of received signals which together form the signal vector (x); and 15: using at least one full cycle for each calculation of a total covariance matrix (R).

The present invention is not limited to the examples above, but may vary freely within the scope of the appended claims.

For example, the number of antenna elements used in each sub-array may vary. Also, the number of sub-arrays in the array antenna 9 may vary. The number of antenna elements used in each sub-array should, however, be the same. For example, there may be only one switch and eight antenna elements, where the switch switches between these eight antenna elements in a certain order in order to complete a switch cycle. Then the number of sub-arrays K=8, and the number of antenna elements in each sub-array P=1.

In the simplest form of the present invention, there is only one switch and two antenna elements, where the switch switches between these two antenna elements in order to complete a switch cycle. Then the number of sub-arrays K=2, and the number of antenna elements in each sub-array P=1.

A covariance matrix estimation may be performed using one switch cycle. In order to perform a better covariance matrix estimation, more than one switch cycle may be used.

The calculated covariance matrix R is useful for estimating DOA, and may be used for several other purposes. For example, the calculated covariance matrix R may be used for estimating the channel and for interference suppression. Generally, the calculated covariance matrix R may be used for all second order statistic problems that may arise for an antenna application according to the above.

In order to achieve full rank for the matrix R, a necessary, but not sufficient requirement is that the number of switch cycles that are performed at least is equal to the total number of antenna elements in the array antenna.

The invention claimed is:

1. An array antenna arrangement comprising:
   at least two antenna sub-arrays and at least one antenna element in each antenna sub-array, the array antenna arrangement being operable to calculate a total covariance matrix (R) of a received signal vector (x), wherein the array antenna arrangement further comprises at least one switch, where the number of switches corresponds to the number of antenna elements in each antenna sub-array, each switch being coupled to a respective radio chain, each switch further being arranged to couple the antenna elements of a respective corresponding antenna sub-array to the respective radio chain cyclically, where at least one full switch cycle, comprising a set of received signals for each switch configuration, is carried out for a calculation of the total covariance matrix (R).

2. The array antenna arrangement according to claim 1, wherein correlations are calculated for each set of received signals during a full switch cycle, forming covariance sub-matrices, such covariance sub-matrices being combined so as to form the total covariance matrix (R).

3. The array antenna arrangement according to claim 1, wherein the sets of received signals for a full switch cycle are combined, forming the received signal vector (x), where the total covariance matrix (R) is calculated directly for the received signal vector (x).

4. The array antenna arrangement according to claim 1 wherein the number of full switch cycles used for calculating the total covariance matrix (R) equals or exceeds the dimension of the total covariance matrix (R).

5. The array antenna arrangement according to claim 1 wherein the total covariance matrix (R) is used for estimating DOA (Direction Of Arrival).

6. The array antenna arrangement according to claim 1 wherein the total covariance matrix (R) is used for estimating the channel.

7. The array antenna arrangement (9) according to claim 1 wherein the total covariance matrix (R) is used for suppression of interference.

8. A method used in a wireless communication apparatus for calculating a total covariance matrix (R) of a signal vector (x), received by means of at least two antenna sub-arrays and at least one antenna element in each sub-array, wherein the method comprises the steps:

cyclically acquiring a plurality of sets of received signals such that one full cycle results in acquired sets of received signals which together form the signal vector (x); and using at least one full cycle for each calculation of a total covariance matrix (R).

9. The method according to claim 8, further comprising the steps of:

calculating correlations for each set of received signals during a full cycle;

forming covariance sub-matrices; and combining the covariance sub-matrices so as to form the total covariance matrix (R).

10. The method according to claim 8, wherein the sets of received signals for a full switch cycle are combined, forming the signal vector (x), where the total covariance matrix (R) is calculated directly for the signal vector (x).

11. The method according to claim 8 wherein the number of full switch cycles used for calculating the total covariance matrix (R) equals or exceeds the dimension of the total covariance matrix (R).

12. The method according to claim 8 wherein at least one switch connected to a respective radio chain, is used for connecting an equal number of antenna elements to the respective radio chain cyclically, where the number of switches corresponds to the number of antenna elements in each antenna sub-array.

13. The method according to claim 8 wherein the total covariance matrix (R) is used for estimating DOA (Direction Of Arrival).

14. The method according to claim 8 wherein the total covariance matrix (R) is used for estimating the channel.

15. The method according to claim 8 wherein the total covariance matrix (R) is used for suppression of interference.

* * * * *

UNITED STATES PATENT AND TRADEMARK OFFICE
CERTIFICATE OF CORRECTION

PATENT NO. : 7,948,436 B2
APPLICATION NO. : 12/530409
DATED : May 24, 2011
INVENTOR(S) : Lindgren et al.

Page 1 of 1

It is certified that error appears in the above-identified patent and that said Letters Patent is hereby corrected as shown below:

In Column 4, Line 14, after "engage the" delete "5".

In Column 4, Line 28, delete "$\tilde{x}_1 + \tilde{x}_3 + \tilde{x}_3$" and insert -- $\tilde{x}_1 + \tilde{x}_2 + \tilde{x}_3$ --, therefor.

In Column 9, Line 29, in Claim 7, after "arrangement" delete "(9)".

In Column 10, Line 23, in Claim 12, delete "switch" and insert -- switch, --, therefor.

Signed and Sealed this
Twenty-seventh Day of December, 2011

David J. Kappos
*Director of the United States Patent and Trademark Office*